United States Patent
Patel et al.

(10) Patent No.: US 8,495,272 B2
(45) Date of Patent: Jul. 23, 2013

(54) METHOD TO SAVE BUS SWITCHING POWER AND REDUCE NOISE IN AN ENGINEERED BUS

(75) Inventors: Piyush Chunilal Patel, Cary, NC (US); Deepak K. Singh, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1580 days.

(21) Appl. No.: 11/564,563

(22) Filed: Nov. 29, 2006

(65) Prior Publication Data

US 2008/0126666 A1 May 29, 2008

(51) Int. Cl.
*G06F 13/00* (2006.01)
*G06F 13/28* (2006.01)
*G06F 1/26* (2006.01)
*G06F 1/32* (2006.01)
*G06F 1/00* (2006.01)

(52) U.S. Cl.
USPC ............ 710/316; 711/122; 713/320; 713/324

(58) Field of Classification Search
USPC .................... 710/316; 711/122; 713/320, 324
See application file for complete search history.

(56) References Cited

U.S. PATENT DOCUMENTS

| | | | | |
|---|---|---|---|---|
| 5,528,764 A | * | 6/1996 | Heil ............................... | 710/113 |
| 5,572,701 A | * | 11/1996 | Ishida et al. ................... | 711/146 |
| 5,727,180 A | * | 3/1998 | Davis et al. .................... | 711/100 |
| 5,802,323 A | * | 9/1998 | Bujanos et al. ................ | 710/107 |
| 5,835,934 A | * | 11/1998 | Tran ................................. | 711/3 |
| 5,895,487 A | * | 4/1999 | Boyd et al. ..................... | 711/122 |
| 6,035,392 A | * | 3/2000 | Liptay et al. ................... | 712/236 |
| 6,353,874 B1 | * | 3/2002 | Morein ........................... | 711/118 |
| 6,651,142 B1 | * | 11/2003 | Gorelik et al. ................. | 711/119 |
| 7,076,613 B2 | * | 7/2006 | Peir et al. ....................... | 711/141 |
| 2002/0067650 A1 | * | 6/2002 | Tanaka et al. .................. | 365/222 |
| 2006/0179175 A1 | * | 8/2006 | Bockhaus et al. .............. | 710/22 |
| 2012/0137157 A1 | * | 5/2012 | Olsson et al. .................. | 713/324 |

FOREIGN PATENT DOCUMENTS

| | | | |
|---|---|---|---|
| EP | 509676 A1 | * | 10/1992 |
| EP | 811930 A2 | * | 12/1997 |
| JP | 63180153 A | * | 7/1988 |
| JP | 06231073 A | | 8/1994 |
| JP | 7084839 A | | 3/1995 |
| JP | 08202620 A | * | 8/1996 |

(Continued)

OTHER PUBLICATIONS

"bus", Microsoft Computer Dictionary, Fifth Edition, Microsoft Corporation, 2002, p. 77.*

(Continued)

*Primary Examiner* — Faisal M Zaman
(74) *Attorney, Agent, or Firm* — Yee & Associates, P.C.; Ian D. MacKinnon

(57) ABSTRACT

A computer implemented method, bus switching system, and computer usable program code are provided for saving bus switching power and reducing noise. A request for data is received from a requester by a first cache. A determination is made as to whether the data is stored on the first cache. Responsive to determining that the data is stored on the first cache, a bus in a plurality of buses is identified on which to return the data forming an identified bus. The data is sent to the requester on the identified bus. A logical state is initiated on the remaining plurality of buses stemming from the first cache in order to save bus switching power and reducing noise.

19 Claims, 4 Drawing Sheets

FOREIGN PATENT DOCUMENTS

| | | | | |
|---|---|---|---|---|
| JP | 09288578 | A | * | 11/1997 |
| JP | 10254779 | A | | 9/1998 |
| JP | 2009064471 | A | * | 3/2009 |
| WO | WO 9802818 | A1 | * | 1/1998 |

OTHER PUBLICATIONS

"NN9010139: Address Transition Detection-Based Unclocked BICMOS Memory Design", Oct. 1, 1990, IBM, IBM Technical Disclosure Bulletin, vol. 33, Iss. 5, pp. 139-143.*

"NN8507567: High Speed Bus Arbiter for Bus-Oriented Multiprocessor Systems", Jul. 1, 1985, IBM, IBM Technical Disclosure Bulletin, vol. 28, Iss. 2, pp. 567-569.*

"NB83045960: Shared Cache in a Checkpoint Environment", Apr. 1, 1983, IBM, IBM Technical Disclosure Bulletin, vol. 25, Iss. 11 B, pp. 5960-5961.*

"NN9703125: Cache Port Fencing for Dual Cache Subsystem", Mar. 1, 1997, IBM, IBM Technical Disclosure Bulletin, vol. 40, Iss. 3, pp. 125-126.*

* cited by examiner

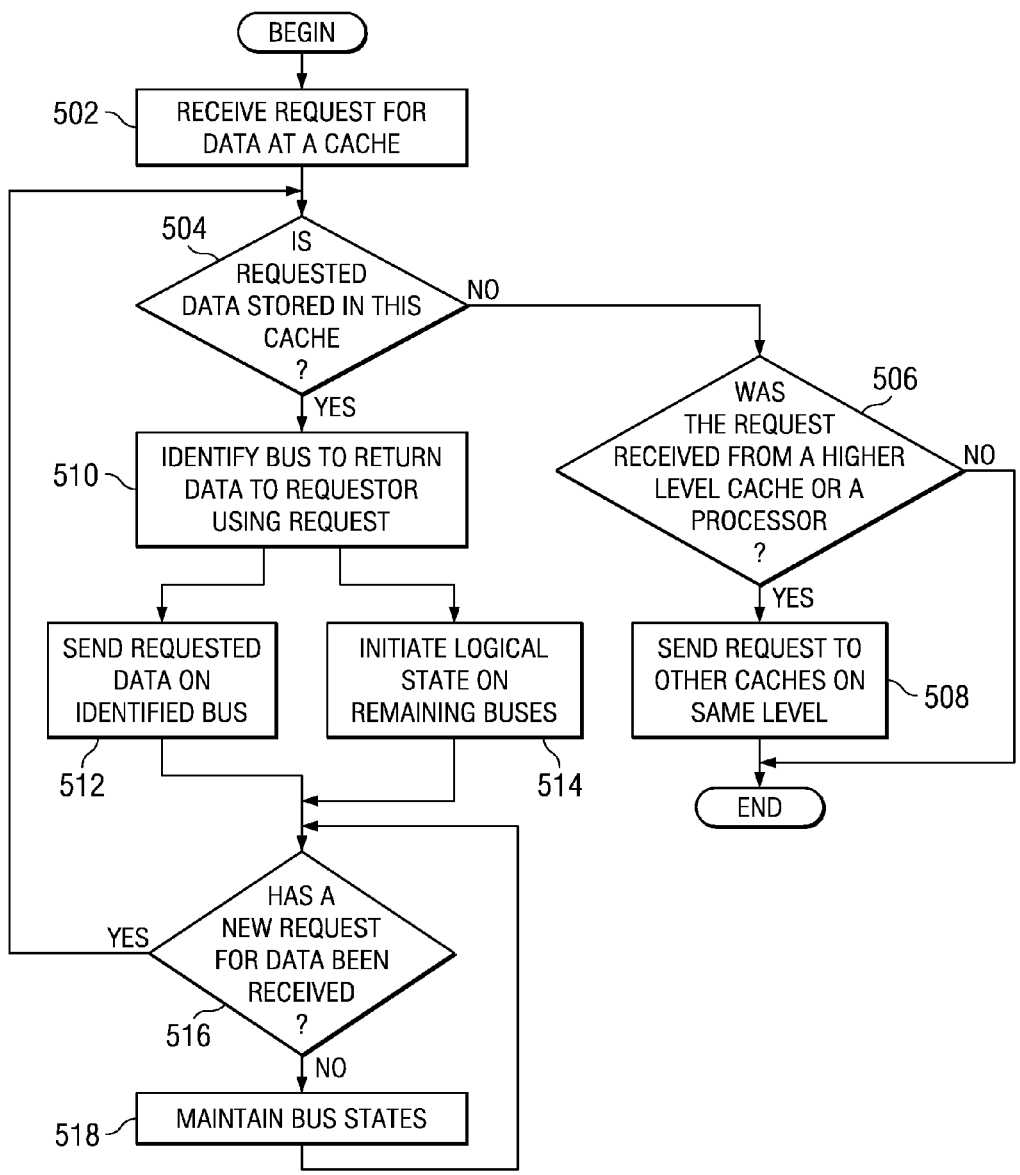

METHOD TO SAVE BUS SWITCHING POWER AND REDUCE NOISE IN AN ENGINEERED BUS

BACKGROUND OF THE INVENTION

1. Field of the Invention

The present invention relates generally to engineered buses. More specifically, the present invention relates generally to a method to save bus switching power and reduce noise in an engineered bus.

2. Description of the Related Art

Multiprocessors are used today to provide better performance at lower cost. Many commercially available multiprocessor systems are based on a shared memory and shared bus architecture. These multiprocessor systems have a relatively straightforward implementation since they are an extension of the uni-processor bus system. The multiprocessor systems' globally shared memory and consistency mechanisms give a programming model that is very similar to systems of cooperating processes on uni-processors.

One limitation of shared bus multiprocessors is the bandwidth of the bus, which limits the number of processors that can be connected to the same memory, and thus the performance of the system. One solution to the bus bandwidth problem is to increase the speed of the bus, which is not always easy because of technology limitations. Another solution to the bus bandwidth problem uses more wires to connect to the memory, such as wide buses or multiple buses. For a given technology, more wires provide more bandwidth, but solution is not obvious as to the best way to connect the wires because of complications such as caches, code sharing, and system complexity.

Multiple buses are more complex to implement, but they reduce contention because of multiple paths to memory and more wires for control and addresses. Wide buses are simpler to build but they provide only one path to memory. A wide bus may be any bus that is over 64-bits wide. Processor chips that implement long wide buses burn power and reduce noise every time the bus switches, whether or not the data on the bus is used or discarded. A long wide bus is a bus that runs a particularly long distance, such as 6 mm, and is over 64-bits wide. To save power and reduce noise, the bus needs to avoid toggling and instead be held in a known logical state.

BRIEF SUMMARY OF THE INVENTION

The different illustrative embodiments provide a computer implemented method, bus switching system, and computer usable program code for saving bus switching power and reducing noise. The illustrative embodiments receive, at a first cache, a request for data from a requestor. The illustrative embodiments determine if the data is stored on the first cache. The illustrative embodiments identify a bus in a plurality of buses on which to return the data to form an identified bus in response to determining that the data is stored on the first cache. The illustrative embodiments send the data to the requestor on the identified bus. The illustrative embodiments initiate a logical state on the remaining plurality of buses stemming from the first cache in order to save bus switching power and reduce noise.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts an exemplary operation of a bus switching mechanism in accordance with an illustrative embodiment.

DETAILED DESCRIPTION OF THE INVENTION

Figure 1:
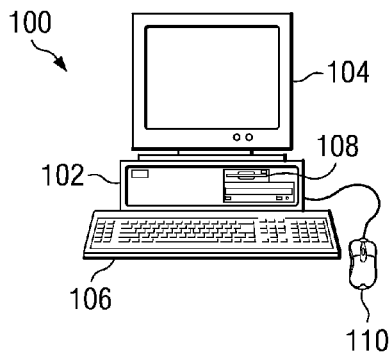
FIG. 1 shows a pictorial representation of a data processing system in which the illustrative embodiments may be implemented.

The illustrative embodiments provide for saving bus switching power and reduce noise in an engineered bus. With reference now to the figures and in particular with reference to FIG. 1, a pictorial representation of a data processing system is shown in which the illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
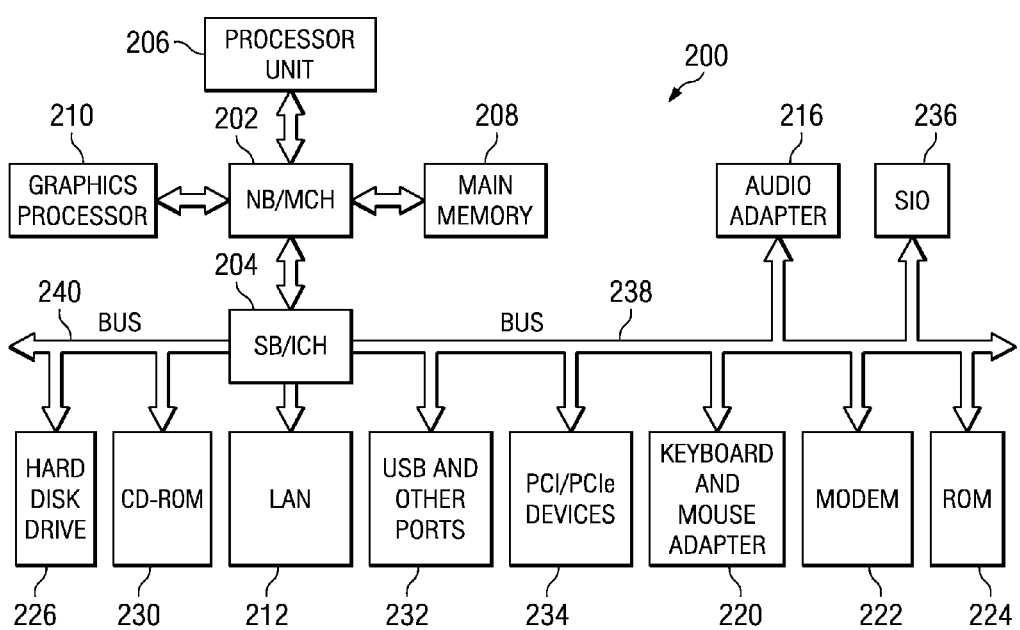
FIG. 2 depicts a block diagram of a data processing system in which the illustrative embodiments may be implemented.

Next, FIG. 2 depicts a block diagram of a data processing system in which the illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described, with respect to the depicted embodiments, may be performed in a data processing system, such as data processing system 100 shown in FIG. 1 or data processing system 200 shown in FIG. 2.

The illustrative embodiments provide for maintaining a logical state on unused buses to save power and reduce noise that would be lost by toggling the buses. When a cache receives a request to send data that the cache has stored, the cache sends the data back to the requestor on one bus and keeps any unused bus in a known logical state so that power will not be used and noise will be reduced. The illustrative embodiments are applied to wide buses that are 64-bits wide, although the concepts described may be applied to a bus that is less than 64-bits or wider than 64-bits wide as well. Processor chips that implement long wide buses burn power and reduce noise every time the bus switches, whether or not the data on the bus is used or discarded. A long wide bus is a bus that runs a particularly long distance, such as 6 mm, and is over 64-bits wide, although the concepts described may be applied to shorter buses as well, except the benefits of power and reduced noise savings will be less. To save power and reduce noise, the bus needs to avoid toggling and instead be held in a known logical state.

Figure 3:
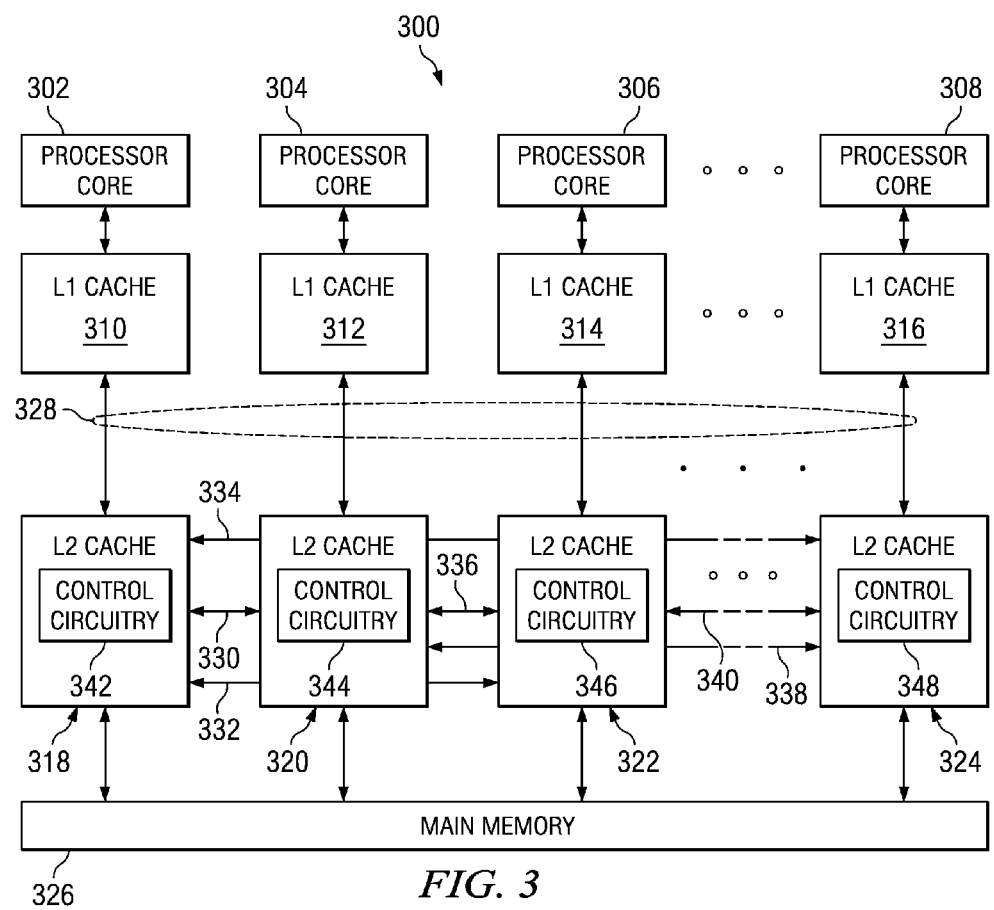
FIG. 3 depicts an exemplary data processing system where a bus switching mechanism may be implemented in accordance with an illustrative embodiment.

FIG. 3 depicts an exemplary data processing system where a bus switching mechanism may be implemented in accordance with an illustrative embodiment. Data processing system 300 shows components used to save power and reduce noise and may be implemented in a data processing system, such as data processing system 200 of FIG. 2. Data processing system 300 includes a processing unit that contains processor cores 302, 304, 306, and 308. These cores may be found in a processing unit, such as such as processing unit 206 of FIG. 2. While data processing system 300 only shows four processor cores, any number of processor cores may be included in the processing unit of data processing system 300. Data processing system 300 also includes two or more levels of cache memory, level 1 caches 310, 312, 314, and 316 and level 2 caches 318, 320, 322, and 324. These levels of cache may be included in a north bridge and memory controller hub, such as north bridge and memory controller hub 202 of FIG. 2.

Level 1 caches 310, 312, 314, and 316 may be fast memory chips that include a small memory size, such as 64 kilobytes for instance. Generally, level 1 caches 310, 312, 314, and 316 are sometimes referred to as "primary caches." Level 1 caches 310, 312, 314, and 316 are located between processor cores 302, 304, 306, and 308 and level 2 caches 318, 320, 322, and 324. Depending on the implementation, level 1 caches 310, 312, 314, and 316 may be integrated on the same integrated circuit as processor cores 302, 304, 306, and 308. Level 1 caches 310, 312, 314, and 316 are also more expensive compared to level 2 caches 318, 320, 322, and 324 because of their faster access speed.

Level 2 caches 318, 320, 322, and 324, secondary caches, are sometimes larger and slower than level 1 caches 310, 312, 314, and 316. Level 2 caches 318, 320, 322, and 324 are generally located between level 1 caches 310, 312, 314, and 316 and main memory 326. Unlike level 1 caches 310, 312, 314, and 316, level 2 caches 318, 320, 322, and 324 may be internal, as described with respect to the illustrative embodiments, or external to the integrated circuit of processor cores 302, 304, 306, and 308. Level 2 caches 318, 320, 322, and 324 may also be cheaper to produce compared to level 1 caches 310, 312, 314, and 316 because of their slower access speed. While the illustrative embodiments illustrate level 1 caches 310, 312, 314, and 316 and level 2 caches 318, 320, 322, and 324, other levels of cache may also be included in data processing system 300, such as a level 3 cache. Each of level 2 caches 318, 320, 322, and 324 are connected to its respective one of level 1 caches 310, 312, 314, and 316 via buses 328 that are each 258-bits wide. Additionally, level 2 caches 318, 320, 322, and 324 are connected to each other via buses 330, 332, 334, 336, 338, and 340.

When a request for data is made by a processing core, for example, processing core 302, a check is first made to determine if the data is in level 1 cache 310 that is associated with processor core 302. If the requested data is not in level 1 cache 310, level 1 cache 310 sends the request to level 2 cache 318 that is associated with level 1 cache 310. Level 2 cache 318 receives the request and determines if the requested data is contained within level 2 cache 318. If level 2 cache 318 does not contain the requested data, level 2 cache 318 sends the request to the other level 2 caches 320, 322, and 324 via buses 330, 332, and 334.

In the illustrative embodiments, bus activity is limited at the cache source that is providing the requested data. In continuing the example above, if the requested data is found in level 2 cache 322, level 2 cache 322 would respond to level 1 cache 310 with requested data through bus 332 to level 2 cache 318 and onto level 1 cache 310. At the same time, level 2 cache 322 would normally toggle off buses 336 and 340 connections to level 2 caches 320 and 324. Toggling off buses that are not used to return the requested data uses power.

In order to save power, toggling of the respective ones of buses 330, 332, 336, 338, and 340 is avoided. Thus, with regard to the above example, instead of toggling off buses 336 and 340, buses 336 and 340 are held in a known logical state. The logical state may be the same state when the data was used the last time, reset so that all bits are "0"s, or a known combination of "0"s and "1"s. Buses 336 and 340 may be held in this logical state for however many cycles as needed until buses 330, 332, 336, 338, and 340 are ready to be used again, such as being overwritten by new data.

The logical state is implemented by one of level 2 caches 318, 320, 322, or 324 that is supplying the requested data, in this example, level 2 cache 322. Each of level 2 caches 318, 320, 322, and 324 have control circuitry 342, 344, 346, or 348, which supplies a logical state to buses 330, 332, 336, 338, or 340 that are not returning the requested data. Each of the unused ones of buses 330, 332, 336, 338, and 340 are 258-bits wide and are subdivided into chunks as follows: <0:22> <23:45> <46:68> <69:91> <92:114> <115:128, 9'b0> <129:151> <152:174> <175:197> <198:220> <221:243> <244:257, 9'b0>. Each chunk is 23 bits wide. For each 23-bit chunk, control circuitry 342, 344, 346, and 348 sets the first 12 consecutive bits to "0" and the remaining 11 consecutive bits to "11" during the inactive state.

Figure 4:
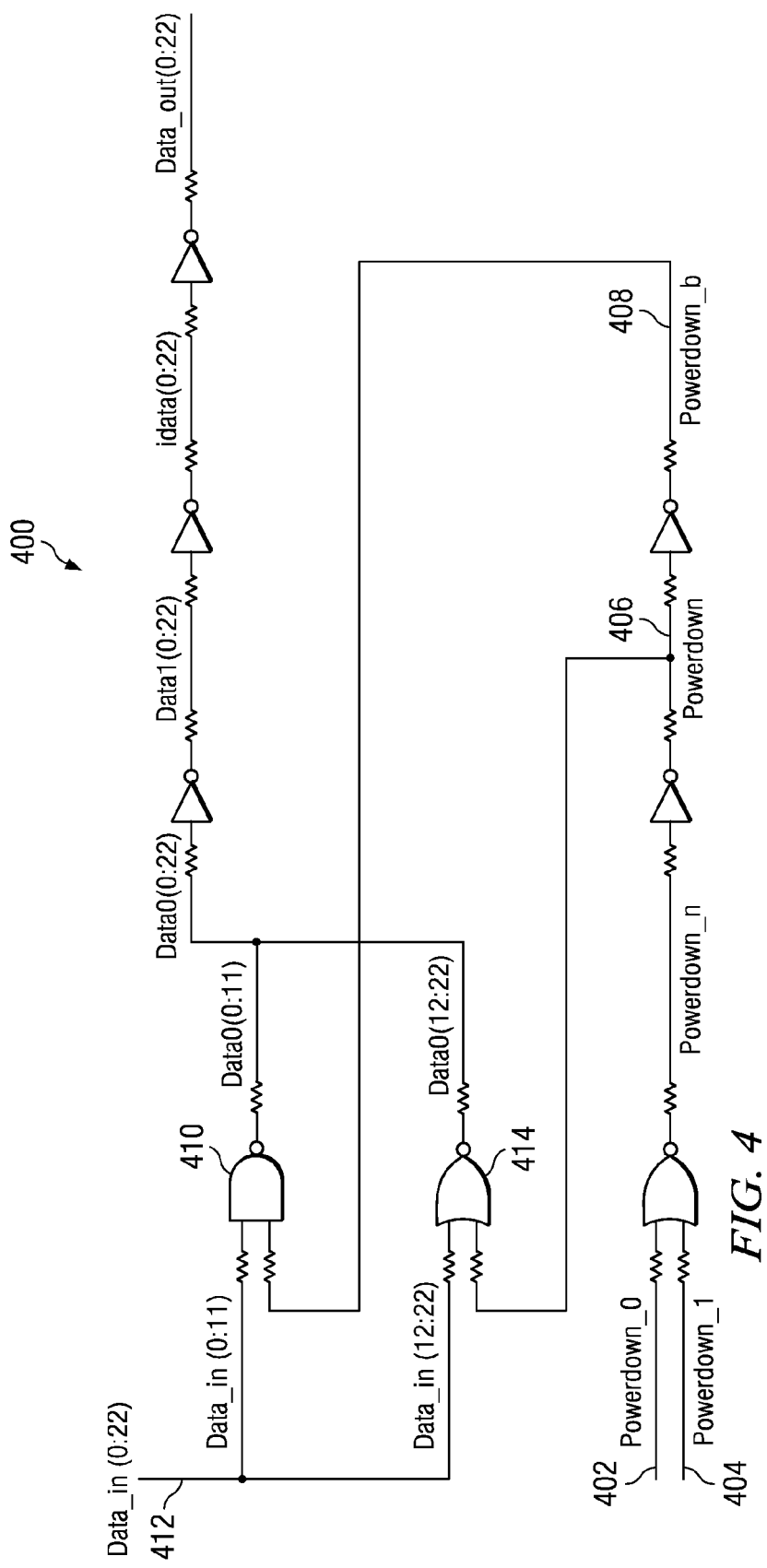
FIG. 4 depicts the control circuitry for implementing a known logical state in accordance with an illustrative embodiment.

FIG. 4 depicts the control circuitry for implementing a known logical state in accordance with an illustrative embodiment. Control circuitry 400 uses logical AND and OR gates ahead of the first buffer in the engineering bus solution. Control circuitry 400 is control circuitry, such as control circuitry 342, 344, 346, and 348 of FIG. 3. The powerdown control signals, powerdown_0 402 and powerdown_1 404, may come from two sources. The two sources may be, for example, the level 2 cache itself or a controller external to the level 2 cache if an override is desired. If either of the two sources activates a powerdown control signal, the bus is set to <12'h0, 11'h3ff> until the powerdown control signal is inactive. When either powerdown_0 402 and powerdown_1 404 are active, two signals are produced, powerdown_a signal 406 and powerdown_b signal 408. Powerdown_b signal 408 is the inverse of powerdown_a signal 406. Powerdown_b signal 408 is an input to AND gate 410 along with the first 12 bits (0:11) of data_in signal 412. AND gate 410 produces 12 consecutive "0" bits. Powerdown_a signal 406 is an input to OR gate 414 along with the remaining 11 bits (12:22) of data_in signal 412. OR gate 414 produces 11 consecutive "1" bits. Setting approximately half bits to "0"s and the other half bits to "1"s is not done in such a way where "0"s and "1"s are successively interleaved. This would burn power during setting the bus due to unwanted Miller coupling. Instead, contiguous bits were set to "0"s to "1"s so that adjacent do not see Miller coupling during set, except at bit positions 12 and 13, but bits 12 and 13 are such that there is already a power grid separating them. If the "0"s and "1"s were distributed such that the bus in powered down state would look like 01010 . . . 01, then a "1" is forced in between two adjacent "0"s and vice-versa. Thus, a "1" is written onto a wire while the two adjacent neighboring wires are written with an opposite polarity. A Miller coupling is a dynamic coupling that appears when adjacent bits of a bus are being switched in opposite directions. By selectively setting the bits in the powered down bus to be contiguous chunks of "1"s or "0"s, the Miller coupling is eliminated because across most of the bits, the two adjacent neighboring bits are switching in the same direction as the bit itself.

In the illustrative embodiments, the switching condition happens at bit<12> when bit<11> is set to a "0", bit<12> is set to a "1", and bit<13> is set to a "1". Thus, bits<11:13> are equal to "011". The Miller coupling between bit<11> and bit<12> is not an issue because Vdd/Gnd power buses are interleaved in between the 23-bit bus and there is a static Vdd line running in between bit<11> and bit<12>. So, the Miller coupling is canceled for the whole bus while powering down the bus.

FIG. 5 depicts an exemplary operation of a bus switching mechanism in accordance with an illustrative embodiment. The switch mechanism may be implemented by control circuitry and a cache, such as control circuitry 400 of FIG. 4 and control circuitry 342, 344, 346, and 348 contained in level 2 cache 318, 320, 322, or 324 of FIG. 3. As the operation begins, a request for data is received by a cache (step 502). The cache determines the requested data is stored in the cache (step 504). If the data is not stored in the cache at step 504, the cache determines if the request was received from a higher level cache or a processor (step 506). If at step 506 the request was received from a cache or processor that is in a hierarchy level higher than the cache, the cache forwards the request to any other caches in the same hierarchy as the receiving cache (step 508), with the operation terminating thereafter. If at step 506 the request originated from a cache on the receiving cache's own hierarchy level, the operation terminates. Receiving a request from a cache on the receiving cache's own hierarchy level indicates that the request has already been sent to the other caches on the same hierarchy level.

Returning to step 504, if the data is stored in the cache, the cache identifies the bus on which the cache should return the requested data using information contained in the request (step 510). The cache then performs two functions. First, the cache sends the requested data to the requestor on the identified bus (step 512). Second, the cache initiates a logical state on the remaining buses (step 514), such that the other buses are not toggled. Initiating the logical state on the other buses may include initiating a known logical state on the other buses, such as the logical state described in FIG. 4, so that power will not be used by toggling the other buses. After the cache has sent the requested data and initiated the logical state, the cache determines if a new request for data has been received (step 516). If no new request has been received at step 516, the cache maintains the current bus states (step 518) and waits for a new request to be received by the operation returning to step 516. If at step 516 a new request for data is received, then the operation returns to step 504.

Thus, the illustrative embodiments provide for saving bus switching power and reduce noise on an engineered bus. A request for data that is stored on the cache is received from a requester at a cache. The cache determines if the data is stored on the cache. Responsive to determining that the data is stored on the cache, the cache identifies a bus in on which to return the data. The cache sends the data to the requester on the identified bus and initiates a logical state on the remaining buses in order to save switching power.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for saving a bus switching power and reducing a noise, the computer implemented method comprising:
   receiving, at a first cache, a request for data from a requestor;
   determining if the data is stored on the first cache;
   responsive to determining that the data is stored on the first cache, identifying a bus in a plurality of buses on which to return the data to form an identified bus;
   sending the data to the requestor on the identified bus; and
   initiating a logical state on a remaining plurality of buses stemming from the first cache in order to save the bus switching power and reduce the noise, wherein the logical state is initiated from a control circuit in the first cache.

2. The computer implemented method of claim 1, further comprising:
   determining if a new request for the data has been received at the first cache; and
   responsive to an absence of the new request being received, maintaining the logical state on the remaining plurality of buses.

3. The computer implemented method of claim 1, further comprising:
   responsive to an absence of the data being found on the first cache, determining if the request came from the requestor in a higher hierarchy level; and
   responsive to the request coming from the requestor in the higher hierarchy level, sending the request to a plurality of caches in a same hierarchy level as the first cache.

4. The computer implemented method of claim 3, further comprising:
   receiving the request at a second cache in the plurality of caches;
   determining if the data is stored on the second cache;
   responsive to determining that the data is stored on the second cache, identifying the bus in the plurality of buses on which the request was received to form a request bus;
   sending the data to the requestor on the request bus; and
   initiating the logical state on the remaining plurality of buses stemming from the second cache in order to save the bus switching power and reduce the noise.

5. The computer implemented method of claim 1, wherein the plurality of buses are 258-bit buses.

6. The computer implemented method of claim 1, wherein the requestor is at least one of a processor or another higher level cache.

7. The computer implemented method of claim 1, wherein initiating the logical state comprises:
   subdividing the remaining plurality of buses stemming from the first cache into a plurality of 23-bit chunks;
   setting an each of a first 12 consecutive bits of each of the plurality of 23-bit chunks to a "0"; and
   setting an each of a remaining 11 consecutive bits of each of the plurality of 23-bit chunks to a "1".

8. A bus switching system comprising:
   a bus system;
   a plurality of caches connected to the bus system, and
   control circuitry in the plurality of caches, wherein a first cache in the plurality of caches receives a request for data from a requestor; determines if the data is stored on the first cache; identifies a bus in the bus system on which to return the data to form an identified bus in response to determining that the data is stored on the first cache; sends the data to the requestor on the identified bus; and initiate a logical state using the control circuitry on the remaining buses in the bus system stemming from the first cache in order to save a bus switching power and reduce a noise, wherein the logical state is initiated from a control circuit in the first cache.

9. The bus switching system of claim 8, further comprising: the first cache determining if a new request for the data has been received; and maintaining the logical state on the remaining buses in the bus system in response to an absence of the new request being received.

10. The bus switching system of claim 8, further comprising:
the first cache determining if the request came from the requestor in a higher hierarchy level in responsive to an absence of the data being found on the first cache; and sending the request to a plurality of caches in a same hierarchy level as the first cache in responsive to the request coming from the requestor in the higher hierarchy level.

11. The bus switching system of claim 10, further comprising:
a second cache in the plurality of caches that receives the request; determines if the data is stored on the second cache; identifies the bus in the bus system on which the request was received to form a request bus in response to determining that the data is stored on the second cache; sends the data to the requestor on the request bus; and initiates the logical state using the control circuitry on the remaining buses in the bus system stemming from the second cache in order to save the bus switching power and reduce the noise.

12. The bus switching system of claim 8, wherein the buses in the bus system are 258-bit buses.

13. The bus switching system of claim 8, wherein the requestor is at least one of a processor or another higher level cache.

14. A computer program product comprising:
a computer usable medium including computer usable program code for saving a bus switching power and reducing a noise, the computer program product including:
computer usable program code for receiving, at a first cache, a request for data from a requestor;
computer usable program code for determining if the data is stored on the first cache;
computer usable program code for identifying a bus in a plurality of buses on which to return the data to form an identified bus in response to determining that the data is stored on the first cache;
computer usable program code for sending the data to the requestor on the identified bus; and
computer usable program code for initiating a logical state on the remaining plurality of buses stemming from the first cache in order to save the bus switching power and reduce the noise, wherein the logical state is initiated from a control circuit in the first cache.

15. The computer program product of claim 14, further including:
computer usable program code for determining if a new request for the data has been received at the first cache;
computer usable program code for maintaining the logical state on the remaining plurality of buses in response to an absence of a new request being received.

16. The computer program product of claim 14, further including:
computer usable program code for determining if the request came from the requestor in a higher hierarchy level in response to an absence of the data being found on the first cache; and
computer usable program code for sending the request to a plurality of caches in a same hierarchy level as the first cache in response to the request coming from the requestor in the higher hierarchy level.

17. The computer program product of claim 16, further including:
computer usable program code for receiving the request at a second cache in the plurality of caches;
computer usable program code for determining if the data is stored on the second cache;
computer usable program code for identifying the bus in the plurality of buses on which the request was received to form a request bus in response to determining that the data is stored on the second cache;
computer usable program code for sending the data to the requestor on the request bus; and
computer usable program code for initiating the logical state on the remaining plurality of buses stemming from the second cache in order to save the bus switching power and reduce the noise.

18. The computer program product of claim 14, wherein the plurality of buses are 258-bit buses.

19. The computer program product of claim 14, wherein the requestor is at least one of a processor or another higher level cache.

* * * * *